(12) United States Patent
Andersen et al.

(10) Patent No.: US 8,643,208 B2
(45) Date of Patent: Feb. 4, 2014

(54) METHOD OF DETERMINING A MAGNET ARRANGEMENT

(76) Inventors: Kurt Andersen, Vorbasse (DK); Erik Groendahl, Them (DK); Kenneth Pedersen, Hjoerring (DK)

(*) Notice: Subject to any disclaimer, the term of this patent is extended or adjusted under 35 U.S.C. 154(b) by 170 days.

(21) Appl. No.: 13/235,577

(22) Filed: Sep. 19, 2011

(65) Prior Publication Data

US 2012/0119506 A1 May 17, 2012

(30) Foreign Application Priority Data

Sep. 24, 2010 (EP) .................................... 10179461

(51) Int. Cl.
*F03D 9/00* (2006.01)

(52) U.S. Cl.
USPC ............................................................ 290/55

(58) Field of Classification Search
USPC .................. 290/54–55; 310/156.53, 156.55, 310/156.45, 156.57, 156.48, 156.61, 156.58
See application file for complete search history.

(56) References Cited

U.S. PATENT DOCUMENTS

| | | | | |
|---|---|---|---|---|
| 7,385,328 B2 * | 6/2008 | Melfi | ....................... | 310/156.45 |
| 7,504,754 B2 * | 3/2009 | Jahns et al. | ............... | 310/156.53 |
| 7,667,363 B2 * | 2/2010 | Adaniya et al. | .......... | 310/156.53 |
| 8,212,447 B2 * | 7/2012 | Fukuda et al. | ........... | 310/156.53 |
| 8,242,654 B2 * | 8/2012 | Yamada et al. | .......... | 310/156.55 |
| 2002/0047432 A1 | 4/2002 | Miyashita et al. | | |
| 2002/0145352 A1 | 10/2002 | Kimura et al. | | |
| 2006/0103251 A1 | 5/2006 | Taniguchi et al. | | |

FOREIGN PATENT DOCUMENTS

EP          1217713  A2     6/2002

* cited by examiner

*Primary Examiner* — Jean F Duverne

(57) ABSTRACT

A method for arranging magnets of a rotor or stator of an electrical machine is provided. In this method a number of performance parameters of the electrical machine are identified. A plurality of neighboring magnets are assigned to a magnet group. The magnet group includes a reference magnet and at least one further magnet. Further, a number of distinct magnet arrangement variables for the magnet group are identified, such that the number of arrangement variables is equal to the number of performance parameters. A value of an arrangement variable is calculated according to a desired adjustment of a performance parameter. Based on the calculated arrangement variable, an arrangement is determined for one of the at least one further magnet of the magnet group relative to the reference magnet of that magnet group.

12 Claims, 3 Drawing Sheets

METHOD OF DETERMINING A MAGNET ARRANGEMENT

CROSS REFERENCE TO RELATED APPLICATIONS

This application claims priority of European Patent Office application No. 10179461.8 EP filed Sep. 24, 2010, which is incorporated by reference herein in its entirety.

FIELD OF INVENTION

The invention describes a method of determining a magnet arrangement for the magnets of an electrical machine. The invention further describes a method of arranging a plurality of magnets of an electrical machine. The invention also describes a wind turbine with a generator and a plurality of magnets arranged in such a magnet arrangement.

BACKGROUND OF INVENTION

For various known reasons, electrical motors and generators cannot operate perfectly, and several factors can detract from the overall efficiency. For example, cogging torque is caused by the magnetic attraction between the magnets of the rotor and the stator slots or stator teeth. In a homogenous arrangement in which the magnets/stator slots are all placed equidistantly, for a certain position of the rotor relative to the stator, the magnetic attraction between the magnets and the stator slots is relatively large. Small motors and generators can usually be satisfactorily optimised. However, in a large machine such as a 3 MW generator in a wind turbine, the cogging torque can easily reach values of 5% of nominal torque. Since this force must be overcome at start-up and many times during each rotation of the rotor, it can have a large impact on the performance of the generator, shortening its lifespan and increasing its noise level. Therefore, measures are usually taken during generator design to reduce the cogging torque.

Another problem is presented by torque ripple, which is the sum of cogging torque and the additional torque variations caused by harmonics in the air gap flux of the machine. Sources of these harmonics are usually the iron of the stator, the distances between rotor magnets and stator, etc. Choosing the number of stator slots to be a multiple of the number of magnets can help reduce the torque ripple by some amount. However, torque ripple can still have a detrimental impact on the efficiency, life time and noise level of the generator.

There are various ways of optimising the performance of an electrical generator. However, the known approaches are quite complicated. For example, to minimise cogging torque, which is caused when the magnets or poles are simultaneously dragged towards the stator teeth, re-arranging the poles in a process known as 'pole shifting' so that they are no longer placed equidistantly to each other can result in a lessening of the cogging torque. However, the improvement will only be ideal for a given rotor position for each stator tooth. Also, the torque ripple may even increase when the poles are shifted with the aim of reducing cogging. However, simulation of a pattern of shifted poles is very cost-intensive, since, according to a rule of thumb, the computation time increases exponentially with increasing poles, so that patterns containing many poles result in very long computation times.

Since the various performance parameters such as cogging and ripple do not have the same optimum, it is necessary to settle for a compromise or trade-off. For example, if cogging is minimised, it is not possible to minimise ripple at the same time. Another important consideration is that pole shifting will always result in a reduction in back emf (electromotive force) and running torque, which is usually a drawback, and the extent of the influence depends on the chosen pole shifting pattern.

Known approaches use software algorithms to simulate the performance of a generator in the light of known parameters such as magnet placement, certain load conditions, etc. However, the iron generally used for the stator and other parts is quite saturated, making the equations very nonlinear and complex. Accurate analysis requires numerical field solutions. The more variables are altered in striving for an optimal solution, the more complicated the analysis becomes. Factors such as manufacturing tolerances such as eccentricity can result in real-life performance that does not fulfil the (simulated) expectations, since the modelled geometry is considerably different from the actual manufactured machine. In approaches based on pole-shifting many magnets with respect to each other, a minor 'error' in the machine geometry can easily negate the benefits of the pole-shifting.

SUMMARY OF INVENTION

It is therefore an object of the invention to provide a straightforward and improved way of determining an optimised arrangement for the magnetic poles of an electrical machine.

The object of the invention is achieved by the features of the independent claims.

According to the invention, the method of determining a magnet arrangement for the magnets of a rotor or stator of an electrical machine comprises the steps of identifying a number of performance parameters of the electrical machine, which performance parameters are to be adjusted; assigning a plurality of neighbouring magnets to a magnet group, wherein a magnet group comprises a reference magnet and at least one further magnet, which further magnet is arranged relative to the reference magnet; identifying a number of distinct magnet arrangement variables for the magnet group, whereby the number of magnet arrangement variables is equal to the number of performance parameters; calculating the value of an arrangement variable according to a desired adjustment of a performance parameter; and arranging a further magnet of the magnet group relative to the reference magnet of that magnet group according to the calculated arrangement variable.

As mentioned in the introduction, during operation of a generator, certain forces can act to detract from the performance of the generator. Significant detractors are cogging torque and torque ripple. In this context, cogging torque and torque ripple may be considered as 'performance parameters' to be optimised. Other performance parameters may be considered, for example the current required to provide a certain torque, structural vibration due to cogging, radial force, average torque, etc. An obvious advantage of the invention is that, in a relatively simple procedure, the performance of an electrical machine can be optimised with respect to one or more of these performance parameters, by adjusting only a minimum number of variables. The number of magnet arrangement variables is restricted to the number of performance parameters. This greatly simplifies the computations required to determine the effects of altering the variables on the performance parameters. Using only a minimum number of variables has the added advantage of increasing the accuracy of the optimisation, since less errors can be introduced into the computations. This reduces the overall cost in realisation of the electrical machine, since less time need be spent on finetuning after production. Further savings can be made during operation of the machine, since losses, noise and fatigue on account of cogging torque, torque ripple, etc. are minimised, allowing the machine to operate more efficiently and reliably within standard limits of noise levels.

By limiting the number of magnet arrangement variables to the number of performance parameters, an optimisation of the performance of the machine is much simpler and faster to carry out, compared to prior art solutions in which many magnets are pole-shifted to minimise only one or two performance parameters. Furthermore, since the pole pattern in the method according to the invention is a repeating pattern, only one pattern needs to be included in the field simulation due to machine symmetry.

According to the invention, a plurality of magnets is arranged on a rotor or stator of an electrical machine according to a magnet arrangement determined using the method described above, and, in a wind turbine with a generator comprising a rotor, a stator and a plurality of magnets, the magnets are arranged on the rotor in this way.

The method according to the invention of determining a magnet arrangement is especially suited for use in determining a magnet arrangement for a plurality of magnets of the rotor or stator of a generator in a wind turbine.

Particularly advantageous embodiments and features of the invention are given by the dependent claims, as revealed in the following description. Features of the different embodiments can be combined as appropriate to give further embodiments.

From an electrical point of view, the 'field' or field component of an electrical machine can be the rotor or the stator, depending on the way in which the electric machine—for example a generator—is constructed. Usually, however, particularly in large generators, the rotor is the field component and bears the magnets, while the stator is the armature component and carries the coil windings. Therefore, in the following but without restricting the invention in any way, it is assumed that the electrical machine is a generator and that the magnets are mounted on the rotor, although the method according to the invention for determining a magnet arrangement would be equally applicable to a realisation in which the magnets are mounted on the stator. Preferably, the generator comprises a direct-drive generator.

In a preferred embodiment of the invention, a magnet group comprises a single reference magnet, and all other magnets of that magnet group can be adjusted relative to that one reference magnet.

To ensure that the determined magnet arrangement results in the desired performance, each magnet of the plurality of magnets should be considered, i.e. included in a group, since any magnets that might be 'left out' of the magnet arrangement may have a detrimental effect on the performance during operation of the generator. In a preferred embodiment of the invention, therefore, the total number of magnets comprises an integer number of identical magnet groups, i.e. the total number of magnets is an integer multiple of the group size, and the group size is the same for all groups, so that no magnet is left out of the optimisation process.

In a particularly preferred embodiment of the invention, the magnets of each magnet group are arranged identically, i.e. the pattern of magnets is repeated for all groups. By arranging the magnets of each group in the same way, the optimisation is simpler to perform, since the simulation time can be kept to a minimum. Also, the ultimate mounting of the magnets onto the rotor is simplified, since the magnets of each group are mounted in a pattern that repeats itself.

Preferably, the group size is kept small, so that a magnet group comprises only a few magnets, for example at most four, whereby one is a reference magnet and the others are adjusted by moving them with respect to the reference magnet and/or by altering their width and/or by using staggered poles. By using such small groups or patterns, repeated for all the magnets, any normalised error in the machine geometry pertaining to the magnet arrangement can favourably be counteracted or negated by unavoidable errors elsewhere in the machine, for example minor departures in the dimensions of the components, rotor eccentricity, etc. Although in practice the group size may be in the region of 5% of the total number of poles, the method according to the invention can be used for larger group sizes. For example, it is conceivable that a group could comprise a quarter of the total number of poles, so that the poles are virtually divided into four such groups.

In the method according to the invention, any suitable magnet arrangement variable can be chosen for the optimisation of the performance parameters. In a preferred embodiment of the invention, a magnet arrangement variable comprises a distance between neighbouring magnets of a magnet group. The distance between a further magnet and the reference magnet of a group can be altered to adjust a performance parameter. Other variables are possible. In a further preferred embodiment of the invention, for example, the width of a magnet can be altered (in a computer simulation) to adjust a performance parameter.

In one preferred embodiment of the invention therefore, a magnet group comprises two magnets; the arrangement variable comprises the distance between the reference magnet of the magnet group and the other magnet of the magnet group; the performance parameter comprises cogging torque, and the arrangement variable is calculated according to a desired reduction in cogging torque. In this way, the optimal arrangement of the two magnets of each group is determined. This pattern repeats for all magnets of the rotor. When the magnets are mounted onto the rotor, the reference magnets are placed at the 'standard' positions, and the other magnets are mounted according to the computed distance from their corresponding reference magnets.

In another preferred embodiment of the invention, a magnet group comprises three magnets; the first arrangement variable comprises the distance between the reference magnet and a first further magnet of the magnet group; the second arrangement variable comprises the distance between the reference magnet and a second further magnet of the magnet group; the performance parameters comprise cogging torque and ripple torque, and wherein the first and second arrangement variables are calculated according to a desired reduction in cogging torque and according to a desired reduction in ripple torque. In this way, the optimal arrangement of the three magnets of each group is determined. This pattern repeats for all magnets of the rotor. When the magnets are mounted onto the rotor, the reference magnets are placed at the 'standard' positions, and the other magnets are mounted according to the computed distance from their corresponding reference magnets.

Besides cogging torque and torque ripple, other parameters could be optimised. For example, for a wind turbine, a certain load point corresponding to the prevailing wind speeds could be regarded as a primary load point of interest, and the magnet arrangement can be determined in consideration of such a load point. Also, the ripple at lower loads could be minimised by minimising the current, which can also be achieved by appropriately manipulating the magnet arrangement. Besides minimizing current, the overall efficiency for the expected load profile, i.e. for how long the machine is expected to run at certain loads, could be maximised.

The optimisation can be carried out using any suitable technique known to the skilled person. For example, the magnet positions could be determined by experimental positioning. Preferably, the steps of the method are carried out iteratively. To this end, a reasonable 'starting point' can be chosen using estimated values for the chosen variables. The obtainable adjustment of the performance parameters can also be estimated and used as a goal for the optimisation process. Then, in a sequence of iterations, the variables can be adjusted until the desired or satisfactory performance parameters are obtained. Preferably, the steps of the method are performed in a computer simulation, for example using finite element analysis.

BRIEF DESCRIPTION OF THE DRAWINGS

Other objects and features of the present invention will become apparent from the following detailed descriptions considered in conjunction with the accompanying drawings. It is to be understood, however, that the drawings are designed solely for the purposes of illustration and not as a definition of the limits of the invention.

DETAILED DESCRIPTION OF INVENTION

Figure 1:
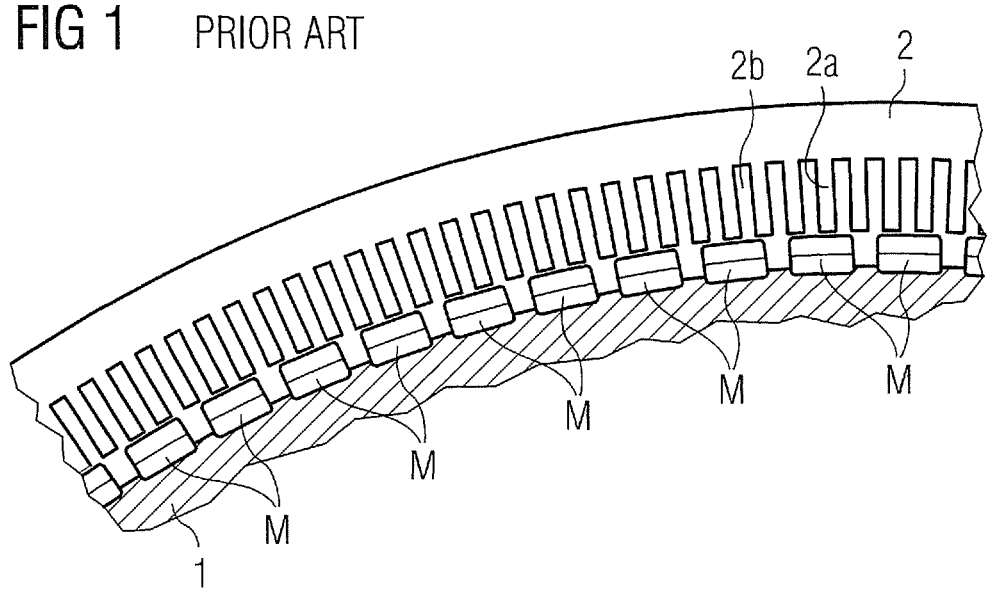
FIG. 1 shows a cross-section through part of an electrical generator showing a stator and a prior art arrangement of magnets on a rotor.

In the drawings, like reference numbers refer to like objects throughout. Objects in the diagrams are not necessarily drawn to scale.

FIG. 1 shows a very simplified cross-section through an electrical generator 3, showing a rotor 1 and a stator 2, and a number of magnets M arranged on the rotor 1. In a conventional, simple arrangement, the magnets M are all spaced at equal distances from one another. The stator 2 comprises a plurality of teeth 2a defining a plurality of slots 2b for accommodating the stator windings (not shown). The stator 2 and therefore also the stator teeth 2a are generally made of steel so that, during operation, a magnetic force acts between the magnets M and the stator teeth 2a, known as cogging torque.

Figure 2:
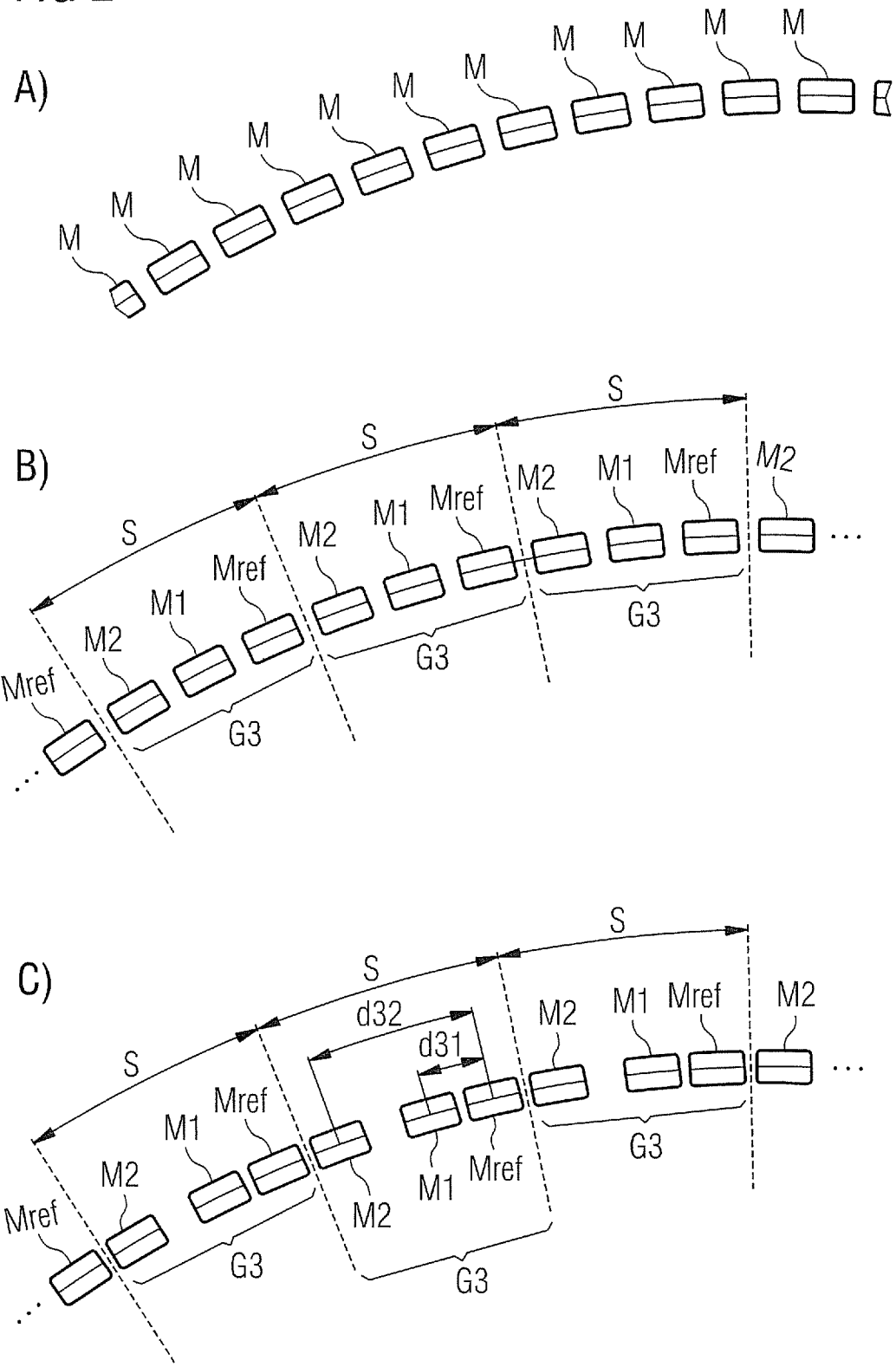
FIG. 2 shows a schematic representation of a first magnet arrangement according to the invention for two performance parameters of the electrical generator.

FIG. 2 illustrates some of the steps taken to arrive at a first magnet arrangement 10 according to the invention for two performance parameters of an electrical generator. Firstly, the magnets M, shown in part A of the diagram to be initially equidistant, are to be divided into groups. Since two performance parameters are to be optimised, the designer may decide to manipulate two magnets with respect to a reference magnet. In this example, it may be assumed that the total number of rotor magnet poles M is divisible by three. Therefore, the magnets M are divided into three-pole groups, i.e. groups G3 of three magnets each, namely a reference magnet Mref and two further magnets M1, M2. Each group occupies a certain radial span S on the surface of the rotor. The designer may decide to use the spacing or pitch d31 between the reference magnet Mref and the first magnet M1, and the spacing or pitch d32 between the reference magnet Mref and the second magnet M2 in optimising the two performance parameters, whereby the span S of the group remains unchanged. In an iterative process, for example using a suitable software programme, an optimal placement can be determined for the magnets M1, M2 relative to the reference magnet Mref to give a desired reduction in cogging torque and a desired reduction in ripple torque. Then, during manufacture of the generator, the magnets M are arranged on the outside of the rotor according to the determined spacings d31, d32.

Figure 3:
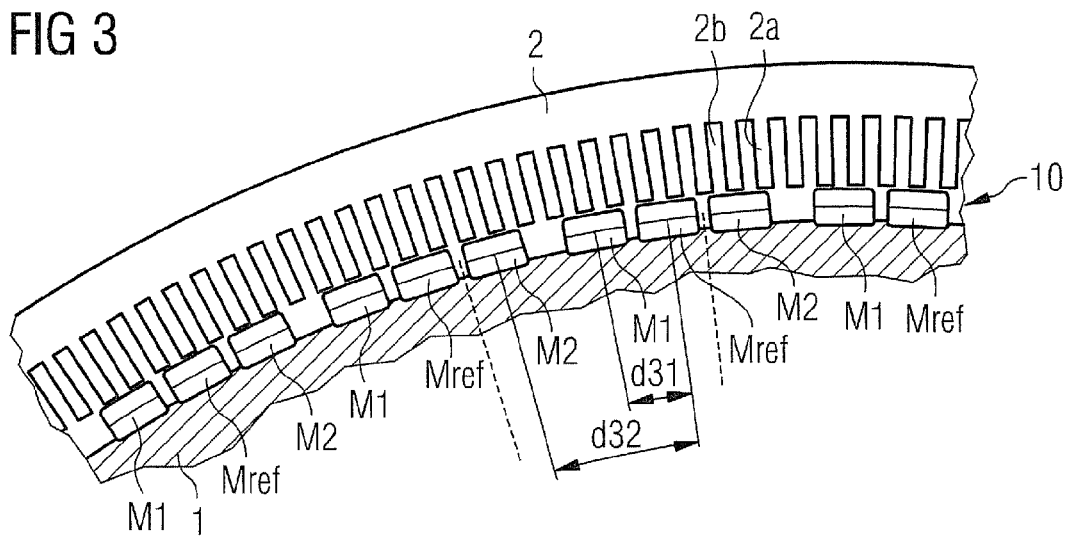
FIG. 3 shows a cross-section through part of an electrical generator with the magnet arrangement according FIG. 2.

Part of such an arrangement 10 is shown in FIG. 3 in a partial cross-section through an electrical generator 3. Magnets M are mounted on the outside of the rotor 1 using the pole pitch spacings d31, d32 calculated as described above for the reference magnet Mref and the other magnets M1, M2 in each three-pole group G3, whereby the radial span of each group remains constant as described in FIG. 2.

Figure 4:
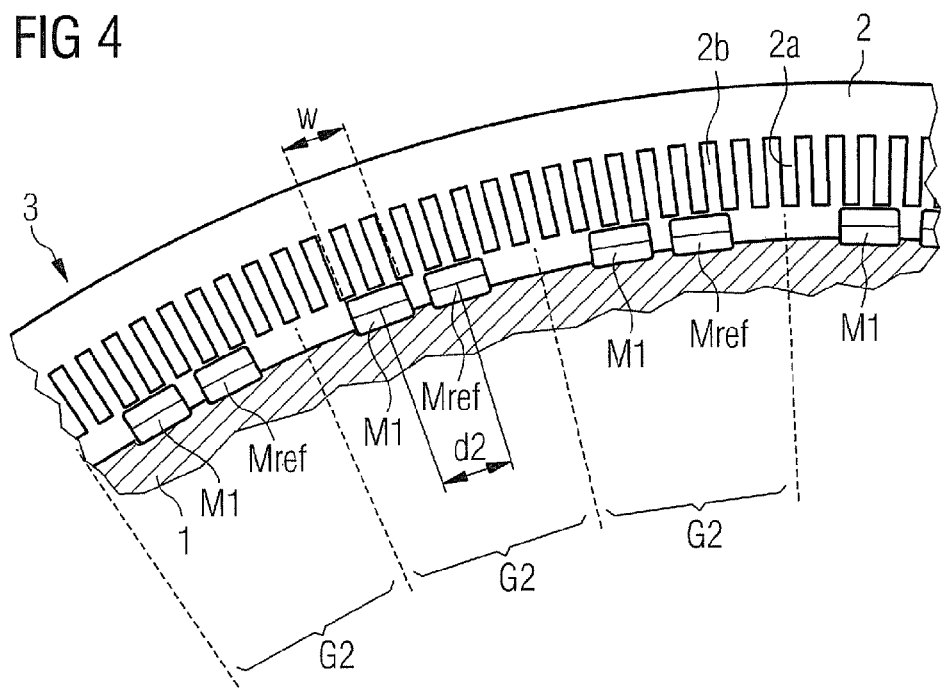
FIG. 4 shows a schematic representation of a second magnet arrangement according to the invention for two performance parameters of the electrical generator.

FIG. 4 shows a schematic representation of a second magnet arrangement 20 according to the invention for two performance parameters of the electrical generator. In this case, the designer may decide to manipulate only one magnet with respect to a reference magnet. Therefore, the magnets M are divided into two-pole groups, i.e. groups G2 of two magnets each, namely a reference magnet Mref and one further magnet M1. The designer may decide to use the spacing d21 between the reference magnet Mref and the other magnet M1, and the width w of one or both of the magnets, in this case the width w of the other magnet M1, whereby the radial span of each group remains constant as described in FIG. 2. Again, in an iterative process, an optimal configuration 20 can be determined for the magnets Mref, M1 to give the desired parameters.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for arranging a plurality of magnets of a rotor or stator of a wind turbine generator, the method comprising the steps of:
    identifying a plurality of performance parameters of the wind turbine generator, which performance parameters are to be adjusted;
    assigning a plurality of neighbouring magnets to a magnet group, wherein a magnet group comprises a reference magnet and at least one further magnet, which further magnet is arranged relative to the reference magnet;
    identifying a plurality of distinct magnet arrangement variables for the magnet group, such that the number of magnet arrangement variables is equal to the number of performance parameters;
    calculating the value of an arrangement variable according to a desired adjustment of a performance parameter; and
    arranging one of the at least one further magnet of the magnet group relative to the reference magnet of that magnet group according to the calculated arrangement variable.

2. The method according to claim 1, wherein a magnet group comprises a single reference magnet.

3. The method according to claim 1, wherein the total number of magnets comprises an integer number of identical magnet groups.

4. The method according to claim 1, wherein the pattern of arrangement of magnets is identical for of each magnet group.

5. The method according to claim 1, wherein an arrangement variable comprises a distance between neighbouring magnets of a magnet group.

6. The method according to claim 1, wherein an arrangement variable comprises a width of a magnet of a magnet group.

7. The method according to claim 1, wherein:
- a magnet group comprises two magnets, one of which is the reference magnet, the other being a further magnet,
- an arrangement variable comprises a distance between the reference magnet and the further magnet of the magnet group,
- a performance parameter comprises a cogging torque, and
- the arrangement variable is calculated according to a desired reduction in cogging torque.

8. The method according to claim 1, wherein:
- a magnet group comprises three magnets, namely the reference magnets and a first and a second further magnet;
- the arrangement variables include a first and a second arrangement variable, the first arrangement variable comprising the distance between the reference magnet and the first further magnet of the magnet group, and the second arrangement variable comprising the distance between the reference magnet and the second further magnet of the magnet group;
- the performance parameters comprises a cogging torque and a ripple torque, and
- the first and second arrangement variables are calculated according to a desired reduction in cogging torque and a desired reduction in ripple torque.

9. A wind turbine, comprising a generator having a rotor, a stator and a plurality of magnets, wherein the magnets are arranged on the rotor or stator in a magnet arrangement according to the method of claim 1.

10. The wind turbine according to claim 9, wherein the generator comprises a direct-drive generator.

11. A computer simulation method for determining an arrangement of magnets of a rotor or stator of a wind turbine generator, the simulation method comprising the steps of:
- identifying a plurality of performance parameters of the wind turbine generator, which performance parameters are to be adjusted;
- assigning a plurality of neighbouring magnets to a magnet group, wherein a magnet group comprises a reference magnet and at least one further magnet, which further magnet is arranged relative to the reference magnet;
- identifying a plurality of distinct magnet arrangement variables for the magnet group, such that the number of magnet arrangement variables is equal to the number of performance parameters;
- calculating the value of an arrangement variable according to a desired adjustment of a performance parameter; and
- determining the arrangement one of the at least one further magnet of the magnet group relative to the reference magnet of that magnet group according to the calculated arrangement variable.

12. The method according to claim 11, wherein the steps of the simulation method are carried out iteratively, wherein the arrangement variable is adjusted until desired performance parameters is obtained.

* * * * *